United States Patent
Fu et al.

(10) Patent No.: US 11,415,994 B2
(45) Date of Patent: Aug. 16, 2022

(54) METHOD AND APPARATUS FOR PLANNING TRAVELLING PATH, AND VEHICLE

(71) Applicant: Baidu Online Network Technology (Beijing) Co., Ltd., Beijing (CN)

(72) Inventors: Xiaoxin Fu, Beijing (CN); Dayang Hao, Beijing (CN); Zhenguang Zhu, Beijing (CN); Zhiyuan Chen, Beijing (CN); Fan Zhu, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 136 days.

(21) Appl. No.: 16/792,645

(22) Filed: Feb. 17, 2020

(65) Prior Publication Data

US 2020/0272157 A1    Aug. 27, 2020

(30) Foreign Application Priority Data

Feb. 22, 2019    (CN) .......................... 201910133965.0

(51) Int. Cl.
  *G05D 1/02*    (2020.01)
  *G01C 21/34*   (2006.01)
  *G08G 1/01*    (2006.01)

(52) U.S. Cl.
  CPC ....... *G05D 1/0214* (2013.01); *G01C 21/3453* (2013.01); *G08G 1/0133* (2013.01); *G08G 1/0145* (2013.01); *G05D 2201/0213* (2013.01)

(58) Field of Classification Search
  CPC ......... G05D 1/0214; G05D 2201/0213; G01C 21/3453; G08G 1/0133; G08G 1/0145
  See application file for complete search history.

(56) References Cited

U.S. PATENT DOCUMENTS 5,710,565 A * 1/1998 Shirai .................... G05D 1/024
                                                        342/72
9,620,015 B2 * 4/2017 Probert ............ G08G 1/096791
(Continued)

FOREIGN PATENT DOCUMENTS

CN    103760904 A    4/2014
CN    104238560 A    12/2014
(Continued)

OTHER PUBLICATIONS

Nieuwenhuisen Matthias et al: "Local multiresolution trajectory optimization for micro aerial vehicles employing continuous curvature transitions", 2016 IEEE/RSJ International Conference on Intelligent Robots and Systems (IROS), IEEE, Oct. 9, 2016 (Oct. 9, 2016), pp. 3219-3224, XP033011847, DOI: 10.1109/IROS.201.*
(Continued)

*Primary Examiner* — Luis A Martinez Borrero
(74) *Attorney, Agent, or Firm* — Benesch, Friedlander, Coplan & Aronoff LLP (57) ABSTRACT

A method and apparatus for planning a travelling path, and a vehicle are provided. The method includes: determining at least one reference curve covering a first length range, and selecting a target reference curve covering the first length range from the at least one reference curve covering the first length range; extracting a curve to be adjusted covering a second length range from the target reference curve covering the first length range; processing the curve to be adjusted based on a safety parameter within the second length range, to obtain an adjusted curve; and determining a travelling path covering the first length range based on the adjusted curve and the target reference curve. The complexity of an actual traffic scene is taken into account, and a travelling path planning is not affected by the accuracy of sampling points.

17 Claims, 5 Drawing Sheets

(56) References Cited

U.S. PATENT DOCUMENTS

| | | | |
|---|---|---|---|
| 9,821,801 B2* | 11/2017 | Di Cairano | B60W 50/087 |
| 9,873,427 B2* | 1/2018 | Danzl | B60W 10/18 |
| 10,274,961 B2* | 4/2019 | Lee | G06V 20/58 |
| 2015/0073663 A1 | 3/2015 | Nilsson et al. | |
| 2015/0284008 A1* | 10/2015 | Tan | B60W 30/12 701/28 |
| 2016/0107682 A1* | 4/2016 | Tan | G05D 1/0212 701/41 |
| 2016/0200317 A1* | 7/2016 | Danzl | B60W 10/04 701/25 |
| 2016/0311431 A1* | 10/2016 | Kato | B60W 30/0956 |
| 2016/0375901 A1* | 12/2016 | Di Cairano | G01C 21/34 701/26 |
| 2017/0008521 A1* | 1/2017 | Braunstein | B60W 60/0015 |
| 2017/0018186 A1* | 1/2017 | Probert | G08G 1/096791 |
| 2017/0120908 A1* | 5/2017 | Oniwa | B60W 50/0097 |
| 2018/0024564 A1* | 1/2018 | Matsuda | G05D 1/0278 701/25 |
| 2018/0126990 A1* | 5/2018 | Shimada | B60W 30/12 |
| 2018/0197414 A1* | 7/2018 | Oooka | B60T 7/12 |
| 2018/0238696 A1* | 8/2018 | Takeda | G01C 21/3676 |
| 2018/0284775 A1* | 10/2018 | Brettschneider | B60W 10/20 |
| 2018/0345963 A1* | 12/2018 | Maura | G05D 1/0088 |
| 2019/0016339 A1* | 1/2019 | Ishioka | B60W 40/04 |
| 2019/0033871 A1* | 1/2019 | Lee | G06V 20/588 |
| 2019/0271985 A1* | 9/2019 | Mimura | G01C 21/3664 |
| 2019/0283777 A1* | 9/2019 | Mimura | B60Q 3/70 |
| 2019/0286149 A1* | 9/2019 | Miura | G01C 21/3415 |
| 2019/0384294 A1* | 12/2019 | Shashua | G06V 20/584 |
| 2020/0033871 A1* | 1/2020 | Kato | G05D 1/0248 |
| 2020/0257301 A1* | 8/2020 | Weiser | G06N 3/02 |
| 2021/0088345 A1* | 3/2021 | Paden | G01C 21/3461 |
| 2021/0146943 A1* | 5/2021 | Oniwa | B60W 50/085 |
| 2021/0146962 A1* | 5/2021 | Kaji | B60W 40/08 |

FOREIGN PATENT DOCUMENTS

| | | |
|---|---|---|
| CN | 106114507 A | 11/2016 |
| CN | 107664502 A | 2/2018 |
| CN | 107992050 A | 5/2018 |
| CN | 108334086 A | 7/2018 |
| CN | 109318890 A | 2/2019 |
| CN | 109765902 A | 5/2019 |
| DE | 102017109400 A1 | 11/2017 |
| JP | 2014-044141 A | 3/2014 |
| JP | 2017016645 A | 1/2017 |
| JP | 2017-087856 A | 5/2017 |
| JP | 2017206182 A | 11/2017 |
| JP | 2018-138404 A | 9/2018 |
| JP | 2018-197048 A | 12/2018 |
| WO | 2017/014012 A1 | 1/2017 |
| WO | 2018061612 A1 | 4/2018 |
| WO | 2018/122998 A1 | 7/2018 |
| WO | 2018/235159 A1 | 12/2018 |

OTHER PUBLICATIONS

Extended European Search Report in European Patent Application No. 20158995.9, dated Jul. 31, 2020 (11 pages).

Nieuwenhuisen, M. et al., "Local Multiresolution Trajectory Optimization for Micro Aerial Vehicles Employing Continuous Curvature Transitions," 2016 IEEE/RSJ International Conference on Intelligent Robots and Systems (IROS), IEEE, Oct. 9, 2016, XP033011847, DOI: 10.1109/IROS.2016.7759497 [retrieved on Nov. 28, 2016] (6 pages).

Notice of Reasons for Refusal issued by the Japanese Patent Office in Japanese Patent Application No. 2020-027726, dated Apr. 28, 2021 (10 pages).

First Office Action from The State Intellectual Property Office of People's Republic of China in Chinese Application No. 2019101339650, dated May 15, 2020 (7 pages).

Search Report issued by The State Intellectual Property Office of People's Republic of China in Chinese Application No. 2019101339650, dated May 7, 2020 (5 pages).

Chen, X. et al., "Driving Decision-making Analysis of Lane-changing for Autonomous Vehicle under Complex Urban Environment," 2017 29th Chinese Control And Decision Conference (CCDC), IEEE, 2017, pp. 7015-7020 (6 pages).

Jiang, Y. et al., "Research on Temporal Consistency and Robustness in Local Planning of Intelligent Vehicles," ACTA Automatica Sinica, Mar. 2015, vol. 41, No. 3, pp. 518-527 (10 pages).

Notification of Reason for Refusal issued by the Korean Patent Office in Korean Application No. 10-2020-0021596, dated Mar. 11, 2021 (15 pages).

* cited by examiner

METHOD AND APPARATUS FOR PLANNING TRAVELLING PATH, AND VEHICLE

CROSS-REFERENCE TO RELATED APPLICATION

This application claims priority to Chinese patent application No. 201910133965.0, filed on Feb. 22, 2019, which is hereby incorporated by reference in its entirety.

TECHNICAL FIELD

The present application relates to a field of driverless control technology, and in particular, to a method and apparatus for planning a travelling path, and a vehicle.

BACKGROUND in the existing method for planning a travelling path of a driverless vehicle, a dynamic planning is often used for post-evaluation, to solve a discrete optimization problem. In this way, although it is ensured that a planning result may be obtained without failure, the quality of the planning result may be greatly affected by the sampling precision. Another way is to adopt a quadratic planning. However, in this way, it is difficult to take the complexity of an actual traffic scene into account and present it.

SUMMARY

A method and apparatus for planning a travelling path, and a vehicle are provided according to embodiments of the application, to solve the technical problems that the complexity of an actual traffic scene may not be taken into account and the path planning is greatly affected by the accuracy of sampling points.

In a first aspect, a method for planning a travelling path is provided according to an embodiment of the application. The method includes:

determining at least one reference curve covering a first length range, and selecting a target reference curve covering the first length range from the at least one reference curve covering the first length range, wherein the target reference curve is a curve which is used for avoiding any obstacle within the first length range;

extracting a curve to be adjusted covering a second length range from the target reference curve covering the first length range, wherein the second length range is smaller than the first length range and the second length range has a same starting point as the first length range;

processing the curve to be adjusted based on a safety parameter within the second length range, to obtain an adjusted curve; and determining a travelling path covering the first length range based on the adjusted curve and the target reference curve.

In an implementation, the determining at least one reference curve covering a first length range includes:

selecting, based on a current position, a travelling reference line segment covering the first length range from the current position, on an initial travelling reference line;

determining at least one sampling point based on the travelling reference line segment; and generating the at least one reference curve covering the first length range based on the determined at least one sampling point.

In an implementation, the selecting a target reference curve covering the first length range from the at least one reference curve covering the first length range includes:

acquiring position information of at least one obstacle within the first length range; and selecting a reference curve from the at least one reference curve covering the first length range as the target reference curve, based on the position information of the at least one obstacle within the first length range, wherein the target reference curve is a reference curve with a minimum path cost, which is used for avoiding the at least one obstacle.

In an implementation, the processing the curve to be adjusted based on a safety parameter within the second length range, to obtain an adjusted curve:

determining the safety parameter within the second length range based on a vehicle parameter and an environmental parameter within the second length range; and processing the curve to be adjusted to obtain the adjusted curve, based on the safety parameter within the second length range.

In an implementation, the determining a travelling path covering the first length range based on e adjusted curve and the target reference curve includes:

splicing the adjusted curve with a part of the target reference curve outside the second length range, to obtain the travelling path covering the first length range.

In an implementation; the method further includes:

determining the target reference curve as the travelling path covering the first length range; when the processing of the curve to be adjusted based on the safety parameter within the second length range is failed.

In a second aspect, an apparatus for planning a travelling path is provided according an embodiment of the application. The apparatus includes:

a dynamic planning unit configured to determine at least one reference curve covering a first length range, and select a target reference curve covering the first length range from the at least one reference curve covering the first length range, wherein the target reference curve is a curve which is used for avoiding any obstacle within the first length range;

a quadratic planning unit configured to extract a curve to be adjusted covering a second length range from the target reference curve covering the first length range, wherein the second length range is smaller than the first length range and the second length range has a same starting point as the first length range, and process the curve to be adjusted based on a safety parameter within the second length range, to obtain an adjusted curve; and a path processing unit configured to determine a travelling path covering the first length range based on the adjusted curve and the target reference curve.

In an implementation, the dynamic planning unit is configured to select, based on a current position, a travelling reference line segment covering the first length range from the current position, on an initial travelling reference line; determine at least one sampling point based on the travelling reference line segment; and generate the at least one reference curve covering the first length range based on the determined at least one sampling point.

In an implementation, the dynamic planning unit is configured to acquire position information of at least one obstacle within the first length range; and select a reference curve from the at least one reference curve covering the first length range as the target reference curve, based on the position information of the at least one obstacle within the first length range, wherein the target reference curve is a reference curve with a minimum path cost, which is used for avoiding the at least one obstacle.

In an implementation, the quadratic planning unit is configured to determine the safety parameter within the second length range based on a vehicle parameter and an environmental parameter within the second length range; and process the curve to be adjusted to obtain the adjusted curve, based on the safety parameter within the second length range.

In an implementation, the path processing unit is configured to splice the adjusted curve with a part of the target reference curve outside the second length range, to obtain the travelling path covering the first length range.

In an implementation, the path processing unit is configured to determine the target reference curve as the travelling path covering the first length range, when the processing of the curve to be adjusted based on the safety parameter within the second length range is failed.

In a third aspect, a vehicle is provided according an embodiment of the application. The functions of the vehicle may be implemented by using hardware or by corresponding software executed by hardware. The hardware or software includes one or more modules corresponding to the functions described above.

In a possible embodiment, the vehicle structurally includes a processor and a storage, wherein the storage is configured to store a program which supports the apparatus in executing the above method for planning a travelling path. The processor is configured to execute the program stored in the memory. The apparatus may further include a communication interface for communicating with other devices or communication networks.

In a fourth aspect, a computer readable storage medium for storing computer programs is provided according to an embodiment of the application. The programs are executed by a processor to implement the method according to the above embodiment.

One of the above technical solutions has the following advantages or beneficial effects: a travelling reference curve may be adjusted in a wide range first, to get a target reference curve, which is used for avoiding an obstacle, and then, based on a safety parameter, an adjustment may be made in a small range, to obtain a final determined travelling path. In this way, upon planning a travelling path, the complexity of an actual traffic scene may be taken into account, and the safety of a path may be adjusted in real time, so that the final determined travelling path may not be affected by the accuracy of sampling points, thereby improving the reliability and accuracy of a travelling path.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Figure 1:
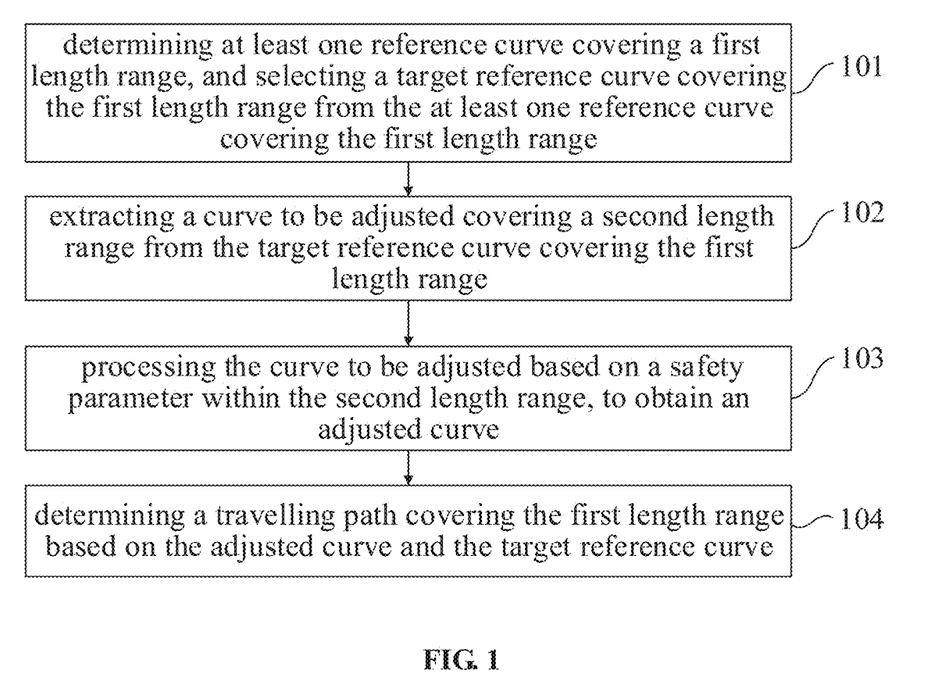
FIG. 1 is a flowchart 1 showing a method for planning a travelling path according to an embodiment of the application.

A method for planning a travelling path is provided according to an embodiment of the application. In an implementation, as illustrated in FIG. 1, a method for planning a travelling path is provided. The method includes the following steps.

At S101, at least one reference curve covering a first length range is determined, and a target reference curve covering the first length range is selected from the at least one reference curve covering the first length range, wherein the target reference curve is a curve which is used for avoiding any obstacle within the first length range.

At S102, a curve to be adjusted within a second length range is extracted from the target reference curve within the first length range, wherein the second length range is shorter than the first length range and the second length range has a same starting point as the first length range.

At 103, the curve to be adjusted is processed based on a safety parameter within the second length range, to obtain an adjusted curve.

At 104, a travelling path covering the first length range is determined based on the adjusted curve and the target reference curve.

In the implementation, a processing scheme is proposed, wherein a wide range planning relies on a dynamic planning and a small range planning relies on a quadratic planning. Here, the dynamic planning is mainly used for planning a travelling path in a relatively long time period. A complex traffic scene may be expressed and modeled conveniently by sampling, to ensure a sufficient obstacle avoidance capability for a driverless vehicle.

In the implementation, the dynamic planning is firstly explained below.

At S101, the determining at least one reference curve covering a first length range includes:

selecting, based on a current position, a travelling reference line segment covering the first length range from the current position, on an initial travelling reference line;

determining at least one sampling point based on the travelling reference line segment; and generating the at least one reference curve covering the first length range based on the determined at least one sampling point.

An initial travelling reference line may be a generated travelling reference line from a start point to an end point. An initial travelling reference line may also be generated as needed by a user.

Figure 2:
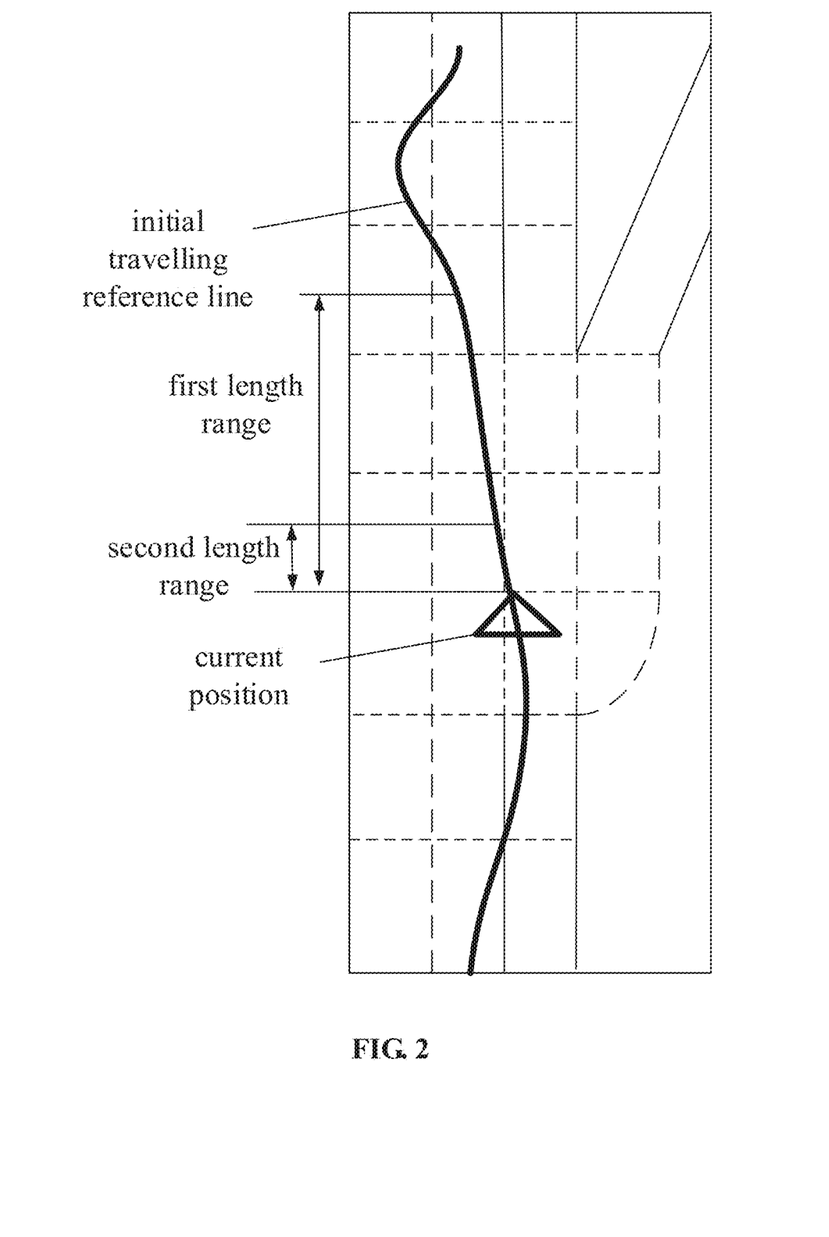
FIG. 2 is a schematic diagram showing a scene of selecting a travelling reference line segment according to an embodiment of the application.

A current position refers to a position at which a vehicle is currently located. Since a vehicle always travels along a travelling reference line, the current position of the vehicle is a certain position on the initial travelling reference line. For example, see FIG. 2, which illustrates an initial travelling reference line with a certain length and the current position of a vehicle. A selected travelling reference line segment covering a first length range is also illustrated in FIG. 2.

It should be understood that both the first length range and the second length range may be set based on actual conditions. For example, the first length range may be a range with a length of 200 m and the second length range may be a range with a length of 20 m. In addition, the second length range has a same starting point as the first length range. As illustrated in FIG. 2, the second length range has a same starting point as the first length range, and the second length range is a smaller than the first length range.

Based on the travelling reference line segment, at least one sampling point is determined. The sampling point may include multiple sampling points selected longitudinally and transversely within the lane range. After at least one sampling point is selected from the initial travelling reference line, at least one sampling point may be further determined within a transverse (i.e., along a vehicle travelling direction) expansion range and a longitudinal (i.e., perpendicular to the vehicle travelling direction) expansion range of the corresponding lane, respectively, to obtain all of the sampling points within the first length range.

Figure 3:
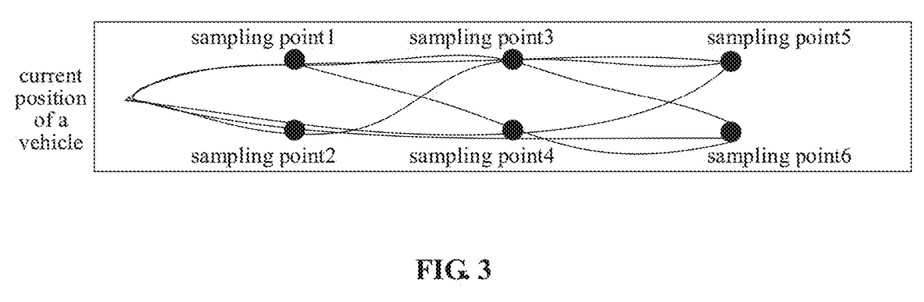
FIG. 3 is a schematic diagram showing a scene of generating at least one curve according to an embodiment of the application.

At least one reference curve covering the first length range may be generated based on the determined at least one sampling point. Specifically, along a travelling direction of a vehicle, parts of the sampling points are selected from the at least one sampling point, and at least one reference curve passing through these sampling points may be generated. Each time, different sampling points may be selected for combination. However, the sampling points selected each time are at least partially different from each other. The principle of selecting sampling points each time may be to select a single sampling point in a direction perpendicular to the travelling direction. For example, referring to FIG. 3, sampling points 1, 4 and 6 may be selected when a curve is to be generated, and sampling points 1, 3 and 6 may be selected when another curve is to be generated. Other possible combinations are not listed here in detail. As illustrated in FIG. 3, at least one reference curve may be generated based on the sampling point selected each time. It should be understood that although some curves in the drawing are partially overlapped and the trend of each curve is not clearly illustrated, it may be deemed that multiple curves may pass through a same sampling point.

Further, the selecting a target reference curve covering the first length e from the at least one reference curve covering the first length range includes:

acquiring position information of at least one obstacle within the first length range; and selecting a reference curve from the at least one reference curve covering the first length range as the target reference curve, based on the position information of the at least one obstacle within the first length range, wherein the target reference curve is a reference curve with a minimum path cost, which is used for avoiding the at least one obstacle.

It should be noted that in the implementation, the obstacle may be an obstacle located within the lane range. For example, an obstacle may be a vehicle, a person, an animal, and the like. Further, any object, as long as it is located within a lane range, may be understood as an obstacle.

Any range covered by the lanes included in the first length range may be understood as the first length range.

The position information of the at least one obstacle within the first length range may be acquired in real time. The real-time acquisition may be realized by a detection with a detection unit provided on the vehicle. For example, the real-time acquisition may be realized by a real-time detection with an infrared detector or a camera. Alternatively, the acquisition of the position information of the obstacle may also be realized by a network-side server. Specifically, a roadside unit may acquire information, which is captured by a device such as a camera provided on a road. Then, the network-side server may process the information acquired by the roadside unit, to finally acquire the location information of the obstacle. After acquiring the position information of the at least one obstacle within the first length range, the server may send it to a vehicle for further processing. Alternatively, the server may send the position information of all obstacles currently present on a road to the vehicle without distinction. Then, the vehicle performs an extraction, to obtain the position information of the at least one obstacle within the first length range.

In the above implementation, the position information of both the vehicle and the obstacle may be represented with a same coordinate system, such as a world coordinate system or a coordinate system used for high-precision maps, which is not limited herein.

The selecting a reference curve from the at least one reference curve covering the first length range as the target reference curve, based on the position information of the at least one obstacle within the first length range, wherein the target reference curve is a reference curve with a minimum path cost, which is used for avoiding the at least one obstacle, may be realized by means of a dynamic planning. For example, $C(i, j)$ represents an j-th curve on an i-th layer. Then, a group of $\{(i, j)\}$ may be determined by using a dynamic planning algorithm, to find out a continuous path with a lowest cost.

Figure 4:
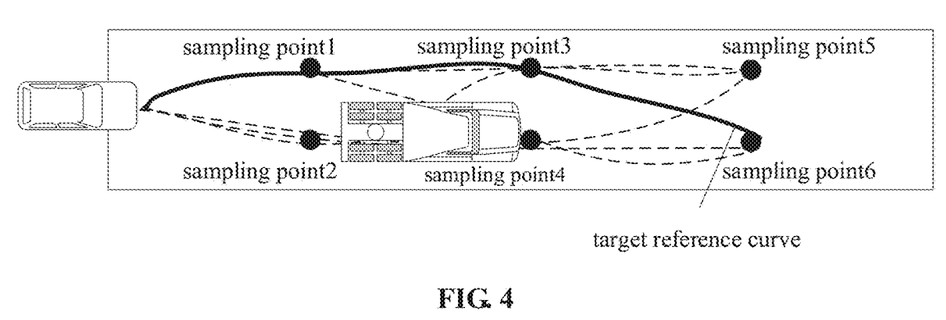
FIG. 4 is a schematic diagram showing a scene of selecting a target reference curve according to an embodiment of the application.

Referring to FIG. 4, the driverless vehicle is the vehicle on the left. There is a vehicle, i.e., an obstacle, within the first length range. Firstly, a target reference curve is selected by means of a dynamic planning.

Figure 5:
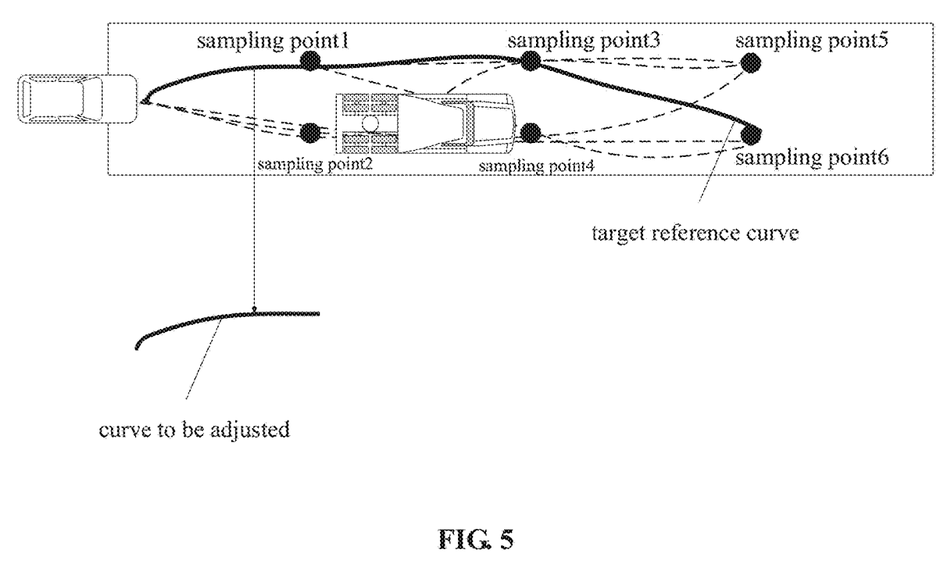
FIG. 5 is a schematic diagram showing a scene of extracting a curve to be adjusted within a second length range from a target reference curve according to an embodiment of the application.

Then, S102 is performed. That is, a curve to be adjusted covering the second length range is extracted from the target reference curve covering the first length range, wherein the second length range is smaller than the first length range and the second length range has a same starting point as the first length range. For example, referring to FIG. 5, a curve covering a second length range is selected from the target reference curve covering a first length range as a curve to be adjusted, based on a same starting point.

In an implementation, the target reference curve is further processed by a method in combination with a quadratic planning. Specifically, on the basis of S101 and S102 described above, as illustrated in FIG. 6, the method further includes the following steps.

Figure 6:
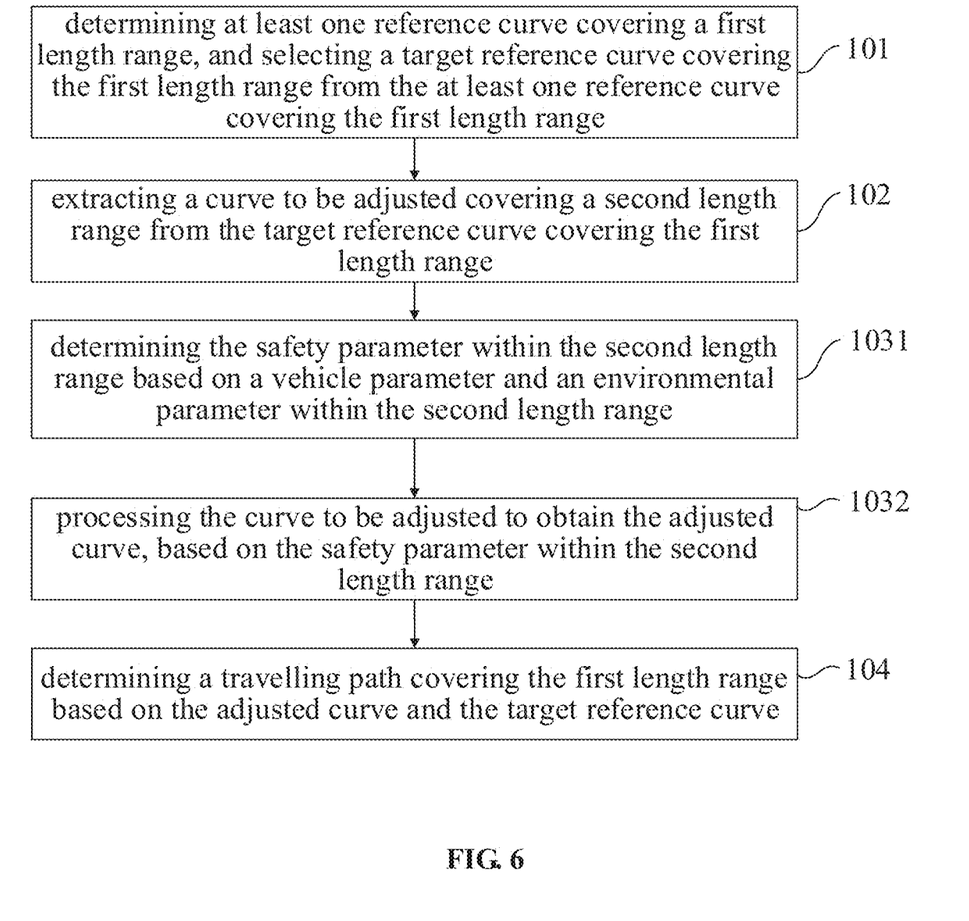
FIG. 6 is a flowchart 2 showing a method for planning a travelling path according to an embodiment of the application.

At S1031, the safety parameter within the second length range is determined based on a vehicle parameter and an environmental parameter within the second length range.

At S1032, the curve to be adjusted is processed to obtain the adjusted curve, based on the safety parameter within the second length range.

The vehicle parameter may be a dimension parameter of a vehicle, such as a length, a width or a height of a vehicle. The environmental parameter may include various parameters. For example, the environmental parameter may include the position information of the obstacle within the lane range described above, and the position information of a static object outside the lane range, such as a road shoulder, a fence.

Then, the safety parameter within the second length range may be determined based on the vehicle parameter and the environmental parameter within the second length range. That is, based on the above vehicle parameter and the environmental parameter, a safety distance that the vehicle may avoid a static or dynamic obstacle or object is determined, and the safety distance may be considered as the safety parameter.

Specifically, in the quadratic planning, the curve to be adjusted may be represented by a polynomial function $l=f(w, s)$ in the Frenet Frame coordinate system, wherein w is a polynomial coefficient. Set $x=w$, then the quadratic planning may be performed by the following two calculations:

minimize $J(x)=x^T H x$;

subject to $Ax \leq b$.

In which, a quality and a score of the curve are calculated by J, minimize means to select an J value with a lowest cost, and x represents a curve parameter. In the above calculation formula, H, A and b are preset parameters, b may be a safety parameter, and A may be a distance from a static or dynamic object, such as an obstacle or a road shoulder, to the curve to be adjusted. Finally, the x obtained through the above calculation is the adjustment result, and the adjusted curve after adjustment may be obtained by bringing the x into $l=f(w, s)$.

The determining a travelling path covering the first length range based on the adjusted curve and the target reference curve includes: splicing the adjusted curve with a part of the target reference curve outside the second length range, to obtain the travelling path covering the first length range.

That is to say, the adjusted curve within the second length range may be spliced with the rest of the target reference curve outside the second length range, to obtain an entire travelling path covering the first length range.

It should be further pointed out that the above process may be executed periodically. The interval between two executions may be set according to the actual situation. For example, it may be set to once every 1 minute, once every 5 minutes, and the like. It may be understood that the periodic execution indicates that the method according to the embodiment of the application is always re-executed from S101, regardless of whether the current travelling path within the first length range has been passed or not. Further, the previous travelling path, which has not been passed completely, may be deleted. The planning result of a corresponding travelling path is re-obtained then, based on an initial travelling reference line and a current position of a vehicle, details are not repeated here again.

Further, the method includes determining the target reference curve as the travelling path covering the first length range, when the processing of the curve to be adjusted based on the safety parameter within the second length range is failed. That is, when performing of the process at S103 or S1031 is failed, the target reference curve obtained by performing S101 may be directly taken as the final travelling path.

It can be seen that by adopting the above solution, a travelling reference curve may be adjusted in a wide range first, to get a target reference curve, which is used for avoiding an obstacle, and then, based on a safety parameter, an adjustment may be made in a small range, to obtain a final determined travelling path. In this way, upon planning a travelling path, the complexity of an actual traffic scene may be taken into account, and the safety of a path may be adjusted, so that the final determined travelling path may not be affected by the accuracy of sampling points, thereby improving the reliability and accuracy of a travelling path.

Figure 7:
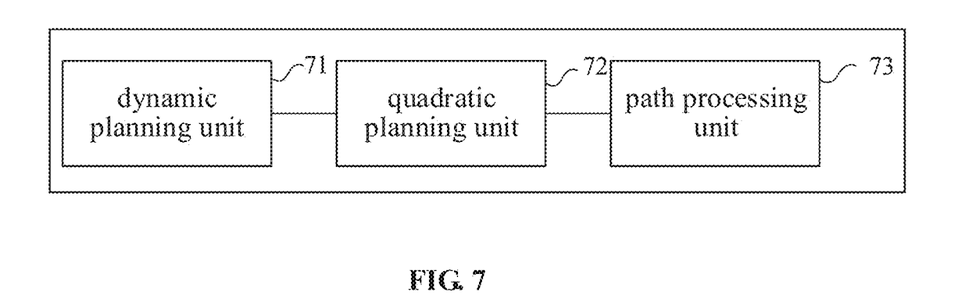
FIG. 7 is a schematic structural diagram showing an apparatus for planning a travelling path according to an embodiment of the application.

In an implementation, an apparatus for planning a travelling path illustrated in FIG. 7 is provided. The apparatus includes:

a dynamic planning unit 71 configured to determine at least one reference curve covering a first length range, and select a target reference curve covering the first length range from the at least one reference curve covering the first length range, wherein the target reference curve is a curve which is used for avoiding any obstacle within the first length range;

a quadratic planning unit 72 configured to extract a curve to be adjusted covering a second length range from the target reference curve covering the first length range, wherein the second length range is smaller than the first length range and the second length range has a same starting point as the first length range, and process the curve to be adjusted based on a safety parameter within the second length range, to obtain an adjusted curve; and a path processing unit 73 configured to determine a travelling path covering the first length range based on the adjusted curve and the target reference curve.

The dynamic planning unit 71 is configured to select, based on a current position, a travelling reference line segment covering the first length range from the current position, on an initial travelling reference line; determine at least one sampling point based on the travelling reference line segment; and generate the at least one reference curve covering the first length range based on the determined at least one sampling point.

The dynamic planning unit 71 is configured to acquire position information of at least one obstacle within the first length range; and select a reference curve from the at least one reference curve covering the first length range as the target reference curve, based on the position information of the at least one obstacle within the first length range, wherein the target reference curve is a reference curve with a minimum path cost, which is used for avoiding the at least one obstacle.

The quadratic planning unit 72 is configured to determine the safety parameter within the second length range based on a vehicle parameter and an environmental parameter within the second length range; and process the curve to be adjusted to obtain the adjusted curve, based on the safety parameter within the second length range.

The path processing unit 73 is configured to splice the adjusted curve with a part of the target reference curve outside the second length range, to obtain the travelling path covering the first length range.

The path processing unit 73 is configured to determine the target reference curve as the travelling path covering the first length range, when the processing of the curve to be adjusted based on the safety parameter within the second length range is failed.

In this embodiment, functions of modules in the apparatus refer to the corresponding description of the method mentioned above and thus a detailed description thereof is omitted herein.

It can be seen that by adopting the above solution, a travelling reference curve may be adjusted in a wide range first, to get a target reference curve, which is used for avoiding an obstacle, and then, based on a safety parameter, an adjustment may be made in a small range, to obtain a final determined travelling path. In this way, upon planning a travelling path, the complexity of an actual traffic scene may be taken into account, and the safety of a path may be adjusted, so that the final determined travelling path may not be affected by the accuracy of sampling points, thereby improving the reliability and accuracy of a travelling path.

Figure 8:
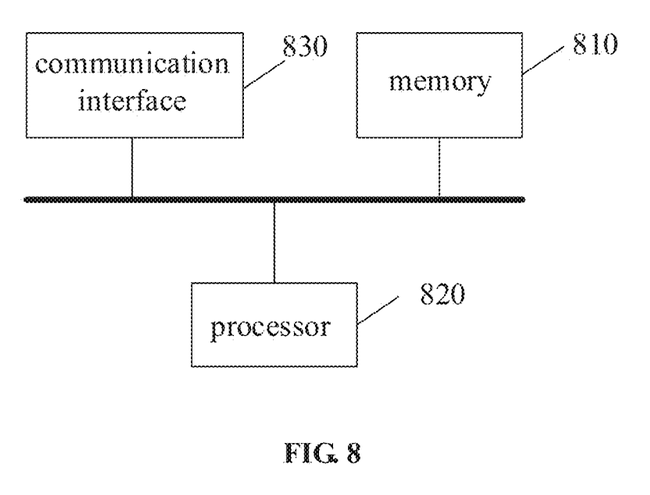
FIG. 8 is a structural block diagram showing a vehicle according to an embodiment of the application.

FIG. 8 is a structural block diagram showing a vehicle according to an embodiment of the application. As shown in FIG. 8, the vehicle includes a memory 810 and a processor 820, wherein a computer program that can run on the processor 820 is stored in the memory 810. The processor 820 executes the computer program to implement the method for planning a travelling path according to the foregoing embodiment. The number of either the memory 810 or the processor 820 may be one or more.

The vehicle may further include a communication interface 930 configured to communicate with an external device and exchange data.

The memory 810 may include a high-speed RAM memory and may also include a non-volatile memory, such as at least one magnetic disk memory.

If the memory 810, the processor 820 and the communication interface 830 are implemented independently, the memory 810, the processor 820 and the communication interface 830 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 8 to represent the bus, but it does not mean that there is only one bus or one type of bus.

Optionally, in a specific implementation, if the memory 810, the processor 820 and the communication interface 830 are integrated on one chip, the memory 810, the processor 820 and the communication interface 830 may implement mutual communication through an internal interface.

In an embodiment of the present invention, it is provided a computer-readable storage medium having computer programs stored thereon. When executed by a processor, the programs implement the method for determining a driving path according to the foregoing embodiment.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present applications "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A method for planning a travelling path, implemented by circuits for implementing control driving functions of a vehicle, comprising:

determining at least one reference curve covering a first length range in a path where the vehicle is located, and selecting a target reference curve covering the first length range in the path where the vehicle is located from the at least one reference curve covering the first length range in the path where the vehicle is located, wherein the target reference curve is a curve which is used for avoiding any obstacle within the first length range;

extracting a curve to be adjusted covering a second length range in the path where the vehicle is located from the target reference curve covering the first length range in the path where the vehicle is located, wherein the second length range is smaller than the first length range and the second length range has a same starting point as the first length range;

processing the curve to be adjusted based on a safety parameter of the vehicle within the second length range, to obtain an adjusted curve;

determining a travelling path for the vehicle covering the first length range in the path where the vehicle is located based on the adjusted curve and the target reference curve; and controlling the vehicle to follow the determined travel path based on the presented driving functions;

wherein the processing the curve to be adjusted based on the safety parameter of the vehicle within the second length range, to obtain an adjusted curve comprises:

determining the safety parameter within the second length range based on a vehicle parameter and an environmental parameter within the second length range; and processing the curve to be adjusted to obtain the adjusted curve, based on the safety parameter of the vehicle within the second length range;

wherein in a quadratic planning, the curve to be adjusted is represented by a polynomial function $l=f(w, s)$ in the Frenet Frame coordinate system, wherein w is a polynomial coefficient; $x=w$ is set, and the quadratic planning is performed by the following two calculations:

minimize $J(x)=x^T H x;$ subject to $Ax \leq b;$ wherein a quality and a score of the curve are calculated by J, minimize means to select an J value with a lowest cost, and x represents a curve parameter; H is a preset parameter, b is a safety parameter, and A is a distance from a static or dynamic object to the curve to be adjusted; the x obtained through the above calculations is an adjustment result, and the adjusted curve after adjustment is obtained by bringing the x into $l=f(w, s)$.

2. The method according to claim 1, wherein the determining the at least one reference curve covering the first length range of the vehicle comprises:

selecting, based on a current position of the vehicle, a travelling reference line segment for the vehicle covering the first length range in the path where the vehicle is located from the current position of the vehicle, on an initial travelling reference line for the vehicle;

determining at least one sampling point based on the travelling reference line segment; and generating the at least one reference curve covering the first length range in the path where the vehicle is located based on the determined at least one sampling point.

3. The method according to claim 2, further comprising:

determining the target reference curve as the travelling path for the vehicle covering the first length range in the path where the vehicle is located, when the processing of the curve to be adjusted based on the safety parameter of the vehicle within the second length range is failed.

4. The method according to claim 1, wherein the selecting the target reference curve covering the first length range in the path where the vehicle is located from the at least one reference curve covering the first length range in the path where the vehicle is located comprises:

acquiring position information of at least one obstacle within the first length range; and selecting a reference curve from the at least one reference curve covering the first length range in the path where the vehicle is located as the target reference curve, based on the position information of the at least one obstacle within the first length range, wherein the target reference curve is a reference curve with a minimum path cost, which is used for avoiding the at least one obstacle.

5. The method according to claim 1, wherein the determining the travelling path for the vehicle covering the first length range in the path where the vehicle is located based on the adjusted curve and the target reference curve comprises:

splicing the adjusted curve with a part of the target reference curve outside the second length range, to obtain the travelling path for the vehicle covering the first length range in the path where the vehicle is located.

6. The method according to claim 1, further comprising: determining the target reference curve as the travelling path for the vehicle covering the first length range in the path where the vehicle is located, when the processing of the curve to be adjusted based on the safety parameter of the vehicle within the second length range is failed.

7. An apparatus for planning a travelling path for a vehicle, implemented by circuits for implementing control driving functions of the vehicle, comprising:
one or more processors; and
a storage device configured to store one or more programs, wherein
the one or more programs, when executed by the one or more processors, cause the one or more processors to:
determine at least one reference curve covering a first length range in a path where the vehicle is located, and select a target reference curve covering the first length range in the path where the vehicle is located from the at least one reference curve covering the first length range in the path where the vehicle is located, wherein the target reference curve is a curve which is used for avoiding any obstacle within the first length range;
extract a curve to be adjusted covering a second length range in the path where the vehicle is located from the target reference curve covering the first length range in the path where the vehicle is located, wherein the second length range is smaller than the first length range and the second length range has a same starting point as the first length range, and process the curve to be adjusted based on a safety parameter of the vehicle within the second length range, to obtain an adjusted curve;
determine a travelling path for the vehicle covering the first length range in the path where the vehicle is located based on the adjusted curve and the target reference curve; and
control the vehicle to follow the determined travel path based on the presented driving functions;
wherein the one or more programs, when executed by the one or more processors, cause the one or more processors further to determine the safety parameter within the second length range based on a vehicle parameter and an environmental parameter within the second length range; and
process the curve to be adjusted to obtain the adjusted curve, based on the safety parameter within the second length range;
wherein in a quadratic planning, the curve to be adjusted is represented by a polynomial function $1=f(w, s)$ in the Frenet Frame coordinate system, wherein w is a polynomial coefficient; $x=w$ is set, and the quadratic planning is performed by the following two calculations:

minimize $J(x)=x^T H x$;

subject to $Ax \leq b$;

wherein a quality and a score of the curve are calculated by J, minimize means to select an J value with a lowest cost, and x represents a curve parameter; H is a preset parameter, b is a safety parameter, and A is a distance from a static or dynamic object to the curve to be adjusted; the x obtained through the above calculations is an adjustment result, and the adjusted curve after adjustment is obtained by bringing the x into $1=f(w, s)$.

8. The apparatus according to claim 7, wherein the one or more programs, when executed by the one or more processors, cause the one or more processors further to select, based on a current position of the vehicle, a travelling reference line segment for the vehicle covering the first length range in the path where the vehicle is located from the current position of the vehicle, on an initial travelling reference line for the vehicle; determine at least one sampling point based on the travelling reference line segment; and generate the at least one reference curve covering the first length range in the path where the vehicle is located based on the determined at least one sampling point.

9. The apparatus according to claim 7, wherein the one or more programs, when executed by the one or more processors, cause the one or more processors further to acquire position information of at least one obstacle within the first length range; and select a reference curve from the at least one reference curve covering the first length range in the path where the vehicle is located as the target reference curve, based on the position information of the at least one obstacle within the first length range, wherein the target reference curve is a reference curve with a minimum path cost, which is used for avoiding the at least one obstacle.

10. The apparatus according to claim 7, wherein the one or more programs, when executed by the one or more processors, cause the one or more processors further to splice the adjusted curve with a part of the target reference curve outside the second length range, to obtain the travelling path for the vehicle covering the first length range in the path where the vehicle is located.

11. The apparatus according to claim 7, wherein the one or more programs, when executed by the one or more processors, cause the one or more processors further to determine the target reference curve as the travelling path for the vehicle covering the first length range in the path where the vehicle is located, when the processing of the curve to be adjusted based on the safety parameter of the vehicle within the second length range is failed.

12. The apparatus according to claim 7, wherein the one or more programs, when executed by the one or more processors, cause the one or more processors further to determine the target reference curve as the travelling path for the vehicle covering the first length range in the path where the vehicle is located, when the processing of the curve to be adjusted based on the safety parameter of the vehicle within the second length range is failed.

13. A non-transitory computer-readable storage medium, implemented by circuits for implementing control driving functions of a vehicle, comprising computer executable instructions stored thereon, wherein the executable instructions, when executed by a processor, cause the processor to:
determine at least one reference curve covering a first length range in a path where the vehicle is located, and selecting a target reference curve covering the first length range in the path where the vehicle is located from the at least one reference curve covering the first length range in the path where the vehicle is located, wherein the target reference curve is a curve which is used for avoiding any obstacle within the first length range;
extract a curve to be adjusted covering a second length range in the path where the vehicle is located from the target reference curve covering the first length range in the path where the vehicle is located, wherein the second length range is smaller than the first length range and the second length range has a same starting point as the first length range;

process the curve to be adjusted based on a safety parameter of the vehicle within the second length range, to obtain an adjusted curve;

determine a travelling path for the vehicle covering the first length range in the path where the vehicle is located based on the adjusted curve and the target reference curve; and controlling the vehicle to follow the determined travel path based on the presented driving functions;

wherein the executable instructions, when executed by a processor, cause the processor further to:

determine the safety parameter within the second length range based on a vehicle parameter and an environmental parameter within the second length range; and process the curve to be adjusted to obtain the adjusted curve, based on the safety parameter within the second length range;

wherein in a quadratic planning, the curve to be adjusted is represented by a polynomial function 1=f(w, s) in the Frenet Frame coordinate system, wherein w is a polynomial coefficient; x=w is set, and the quadratic planning is performed by the following two calculations:

minimize $J(x)=x^T H x;$ subject to $Ax \leq b;$ wherein a quality and a score of the curve are calculated by J, minimize means to select an J value with a lowest cost, and x represents a curve parameter; H is a preset parameter, b is a safety parameter, and A is a distance from a static or dynamic object to the curve to be adjusted; the x obtained through the above calculations is an adjustment result, and the adjusted curve after adjustment is obtained by bringing the x into 1=f(w, s).

14. The non-transitory computer-readable storage medium according to claim 13, wherein the executable instructions, when executed by a processor, cause the processor further to:

select, based on a current position of the vehicle, a travelling reference line segment for the vehicle covering the first length range from in the path where the vehicle is located the current position of the vehicle, on an initial travelling reference line for the vehicle;

determine at least one sampling point based on the travelling reference line segment; and generate the at least one reference curve covering the first length range in the path where the vehicle is located based on the determined at least one sampling point.

15. The non-transitory computer-readable storage medium according to claim 13, wherein the executable instructions, when executed by a processor, cause the processor further to:

acquire position information of at least one obstacle within the first length range; and select a reference curve from the at least one reference curve covering the first length range in the path where the vehicle is located as the target reference curve, based on the position information of the at least one obstacle within the first length range, wherein the target reference curve is a reference curve with a minimum path cost, which is used for avoiding the at least one obstacle.

16. The non-transitory computer-readable storage medium according to claim 13, wherein the executable instructions, when executed by a processor, cause the processor further to:

splice the adjusted curve with a part of the target reference curve outside the second length range, to obtain the travelling path for the vehicle covering the first length range in the path where the vehicle is located.

17. The non-transitory computer-readable storage medium according to claim 13, wherein the executable instructions, when executed by a processor, cause the processor further to:

determine the target reference curve as the travelling path for the vehicle covering the first length range in the path where the vehicle is located, when the processing of the curve to be adjusted based on the safety parameter of the vehicle within the second length range is failed.

* * * * *